(12) United States Patent
Escobar et al.

(10) Patent No.: US 7,643,240 B2
(45) Date of Patent: Jan. 5, 2010

(54) ADJUSTING A FLY-HEIGHT IN HARD DISK DRIVES

(75) Inventors: Jorge F. Escobar, San Jose, CA (US); Steven N. Guilliams, San Francisco, CA (US); Kris Schouterden, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/897,636

(22) Filed: Aug. 30, 2007

(65) Prior Publication Data
US 2009/0059413 A1 Mar. 5, 2009

(51) Int. Cl.
*G11B 21/02* (2006.01)
(52) U.S. Cl. ...................................... 360/75
(58) Field of Classification Search ........................ None
See application file for complete search history.

(56) References Cited

U.S. PATENT DOCUMENTS

| | | | |
|---|---|---|---|
| 5,729,763 A | 3/1998 | Leshem | |
| 5,859,738 A | 1/1999 | Forehand et al. | |
| 5,870,254 A | 2/1999 | Baserman et al. | |
| 6,307,719 B1 * | 10/2001 | Mallary | 360/294.7 |
| 6,320,714 B1 | 11/2001 | Moon et al. | |
| 6,446,156 B1 | 9/2002 | Chia et al. | |
| 6,532,137 B2 | 3/2003 | Huang et al. | |
| 6,661,615 B2 | 12/2003 | Tsuda | |
| 6,757,124 B2 * | 6/2004 | Kelemen | 360/75 |
| 6,760,182 B2 | 7/2004 | Bement et al. | |
| 6,819,513 B2 * | 11/2004 | Chainer et al. | 360/63 |
| 6,876,509 B2 | 4/2005 | Bonin et al. | |
| 7,016,157 B1 | 3/2006 | Williams et al. | |
| 7,023,632 B1 * | 4/2006 | Egan et al. | 360/31 |
| 7,064,932 B1 | 6/2006 | Lin et al. | |
| 2006/0056094 A1 | 3/2006 | Fu et al. | |
| 2007/0025005 A1 | 2/2007 | Shimizu | |
| 2007/0268613 A1 * | 11/2007 | Fitzpatrick et al. | 360/75 |

FOREIGN PATENT DOCUMENTS

JP 2001034929 2/2001

OTHER PUBLICATIONS

Mongkolwongrojn, et al., "Transient Response of Head Slider with Geometry Change in Head Surface of Magnetic Storage Systems", *IEEE*, (2002),35-38.

* cited by examiner

*Primary Examiner*—Jason C Olson

(57) ABSTRACT

A method for increasing reliability of a hard disk drive (HDD) is disclosed. One of a plurality of magnetic read/write heads in a hard disk drive (HDD) is determined to be disabled, and a fly-height associated with the disabled read/write head is increased with respect to a fly-height associated with the plurality of read/write heads.

6 Claims, 9 Drawing Sheets

900

Determine that a read/write head in a hard disk drive (HDD) is disabled.
910

Increase a fly-height associated with the disabled read/write head with respect to a fly-height associated with other read/write heads in the hard disk drive (HDD).
920

ADJUSTING A FLY-HEIGHT IN HARD DISK DRIVES

TECHNICAL FIELD

The invention relates to the field of hard disk drive development.

BACKGROUND ART

Electronic computing devices have become increasingly important to data computation, analysis and storage in our modern society. Modern direct access storage devices (DASDs), such as hard disk drives (HDDs) are heavily relied on to store mass quantities of data for purposes of future retrieval. As such long term data storage has become increasingly popular, and as the speed of microprocessors has steadily increased over time, the need for HDDs with greater storage capacity to store the increased amount of data has steadily increased.

However, the ability of a HDD to quickly read and write data to and from the magnetic storage media is highly dependent on the performance of the electromechanical components of the HDD. Modern HDDs, such as HDDs implementing magnetic storage media, are plagued by imperfections in their design which serve to degrade the lifetime and efficiency with which such HDDs can operate. Thus, there exists a continuing reliability concern regarding the operation of HDDs, and a need for a more efficient paradigm for maximizing the operating efficiency of a HDD.

SUMMARY OF THE INVENTION

A method for increasing reliability of a hard disk drive (HDD) is disclosed. One of a plurality of magnetic read/write heads in a hard disk drive (HDD) is determined to be disabled, and a fly-height associated with the disabled read/write head is increased with respect to a fly-height associated with the plurality of read/write heads.

Further, a fly-height control module is disclosed that is configured to logically depopulate a HDD by increasing the fly-height of a magnetic read/write head relative to a magnetic storage medium in the HDD. Various embodiments of the present technology illustrate methods of how the fly-height control module could be implemented utilizing component deformation, thermal fly-height control (TFC) and "propad" type burnishing technologies. Various other embodiments provide examples of how a fly-height control module could be implemented at different points in a head stack assembly (HSA) in order to achieve the desired increase in fly-height.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
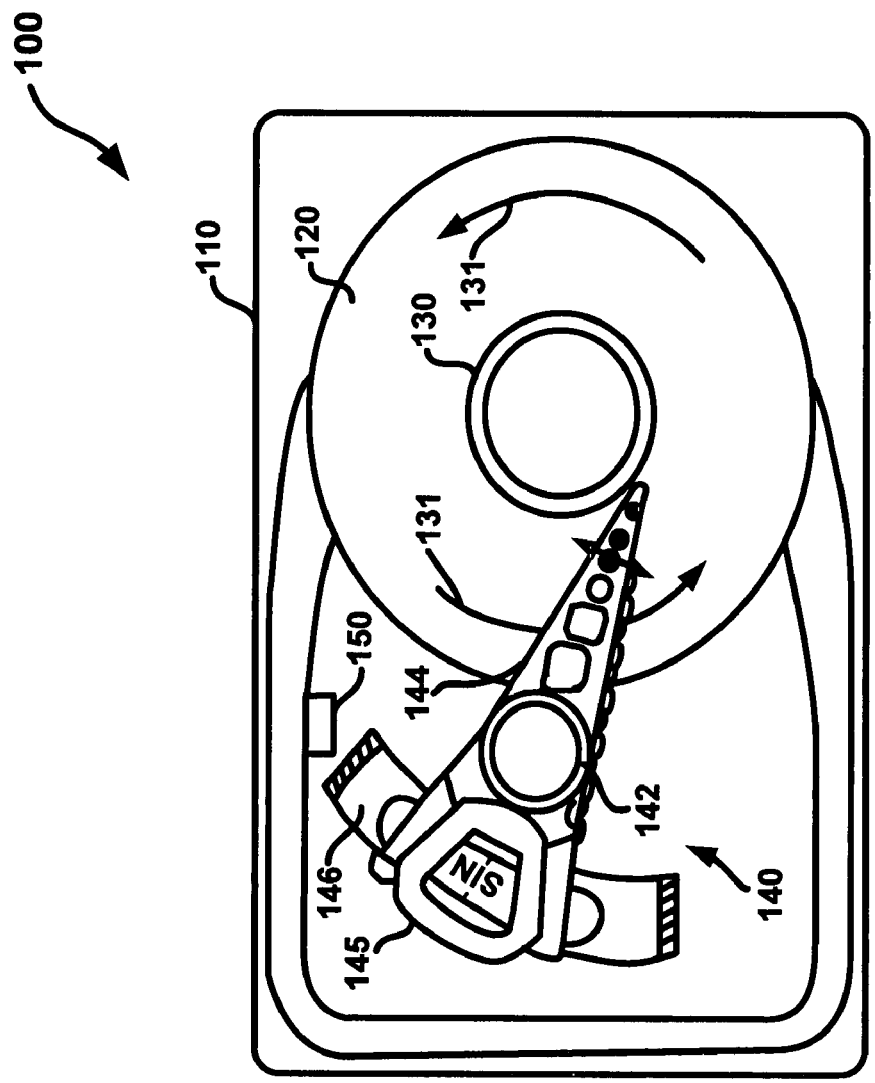
FIG. 1 is plan view of a HDD in accordance with an embodiment of the present invention.

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the presented technology is intended to cover alternatives, modifications and equivalents, which may be included within the spirit and scope of the various embodiments as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Overview

An embodiment of the present invention teaches a mechanism to adjust the fly-height of a magnetic-read/write head in hard disk drives (HDDs) when the read/write head is rendered inoperable. A HDD is logically depopulated by increasing the fly-height height of a magnetic read/write head relative to a magnetic storage medium in the HDD. This not only increases the operating efficiency of the HDD, but also cuts down on manufacturing costs, because drive components that would otherwise have been thrown away or reworked may be reused.

Various embodiments of the present technology illustrate methods of how a fly-height control module could be implemented utilizing component deformation, thermal fly-height control (TFC) and "propad" type burnishing technologies. Various other embodiments provide examples of how a fly-height control module could be implemented at different points in a head stack assembly (HSA) in order to achieve the desired increase in fly-height.

It should be understood by those skilled in the art that various embodiments of the present invention provide a potentially large gain in reliability of a hard disk drive (HDD), because each read/write head in a HDD is characterized by its own failure probability, which increases the overall probability of a HDD failing. Each head's failure probability is independent of the operation of the other read/write heads in the HDD, but is inversely proportional to the head's own fly-height. Thus, an increase in fly-height of a read/write head decreases the head's failure probability, which increases the overall reliability of the HDD.

Numerous specific embodiments will now be set forth in detail to provide a more thorough understanding of the present technology. The discussion of these detailed embodiments will begin with an overview of a hard disk drive (HDD), and the components connected within, according to embodiments of the present invention. The discussion will then focus on embodiments of the invention that provide a fly-height control module configured to logically depopulate a HDD by increasing the fly-height of a magnetic read/write head relative to a magnetic storage medium in the HDD. The discussion will then focus on embodiments of the invention that illustrate how the fly-height control module could be implemented utilizing component deformation, thermal fly-height control (TFC) and "propad" type burnishing technologies. Finally, the discussion will focus on various other embodiments that provide examples of how a fly-height control module could be implemented at different points in a head stack assembly (HSA) in order to achieve the desired increase in fly-height.

However, it should be understood by those skilled in the art that the present technology may be practiced without the specific details of the embodiments disclosed herein. Additionally, it should be understood that although the fly-height control systems mentioned throughout this detailed description are often described as electronic systems, such fly-height control systems may be implemented utilizing hardware alone, or hardware in combination with one or more software modules that have been developed for the purpose of carrying out a task described herein. In other instances, well known methods, procedures, components, and circuits have not been described in detail as not to unnecessarily obscure aspects of the present embodiments.

Furthermore, although embodiments of the present invention will be described in conjunction with logically depopulating a magnetic read/write head in a HDD, it is understood that the embodiments described herein are useful outside of the art of HDD manufacturing, such as devices requiring self-monitoring and repair capabilities while operating in a remote location away from human intervention. The utilization of the HDD depopulating example is only one embodiment and is provided herein merely for purposes of brevity and clarity. Finally, it should be understood that in embodiments of the present technology, one or more of the steps may be performed manually.

Hard Disk Drive (HDD) Configuration

With reference now to FIG. 1, a schematic drawing of one embodiment of an information storage system comprising a magnetic hard disk file or drive 100 for a computer system is shown. Drive 100 has an outer housing or base 110 containing a disk pack comprising at least one magnetic storage medium 120. A spindle motor assembly having a central drive hub 130 rotates the magnetic storage medium 120 in a circular direction. In this way, the magnetic storage medium 120 is rotated within the outer housing or base 110 by the spindle motor assembly and central drive hub 130 such that data may be read from and written to various points on the surface of the magnetic storage medium 120.

With reference still to FIG. 1, the drive 100 further includes an actuator assembly 140 that comprises one or more parallel actuator arms 141 in the form of a comb that is movably or pivotally mounted to the base 110 about a pivot assembly 142. A voice coil 145, free to move within a conventional voice coil motor magnet assembly 146 (top pole not shown), is also mounted to one or more actuator arms 141. In one embodiment, a controller 150 is also mounted to the base 110 for selectively moving one or more parallel actuator arms 141 relative to the magnetic storage medium 120.

Figure 2:
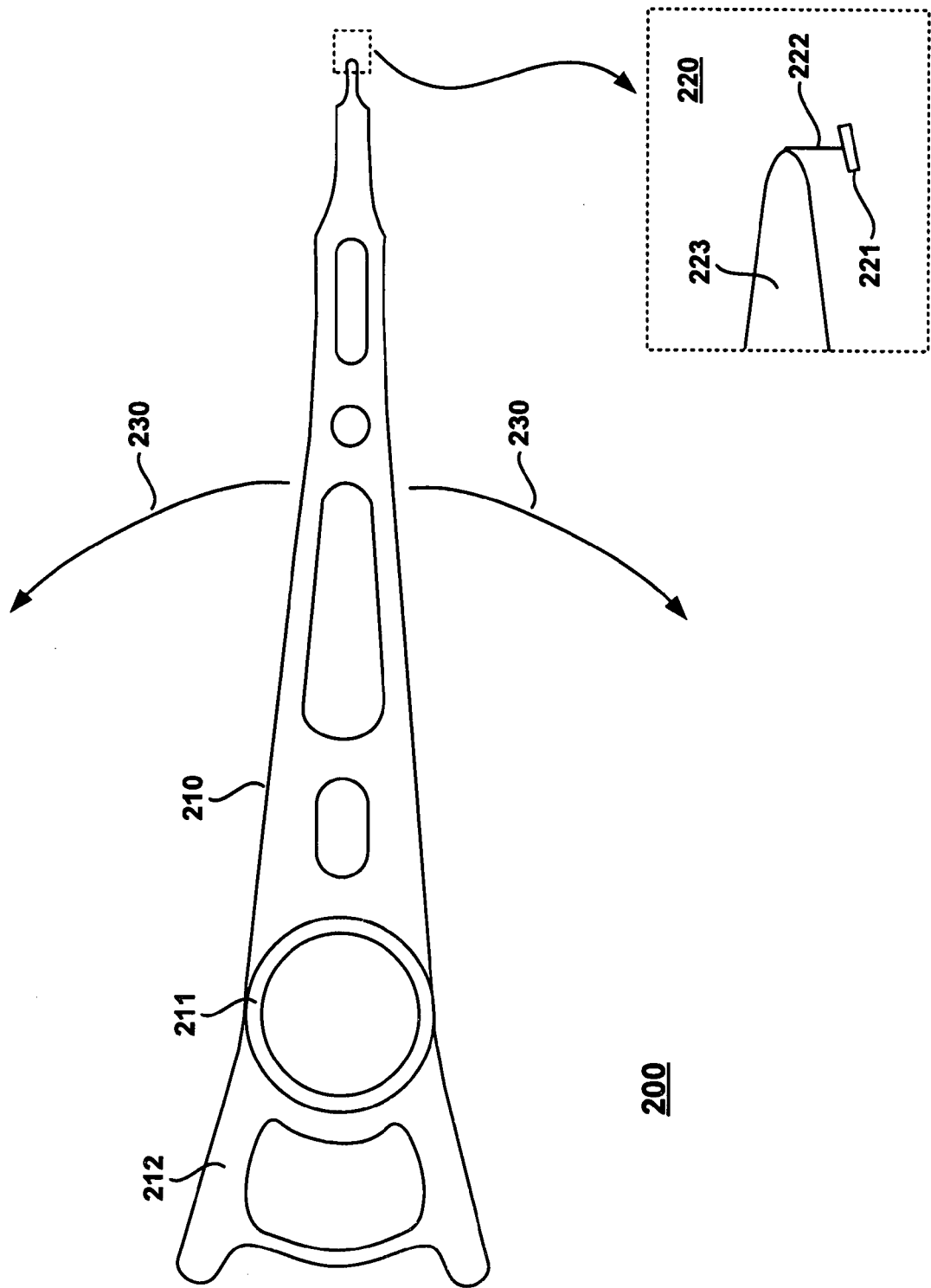
FIG. 2 is an isometric view of an actuator arm and a magnified, cross-sectional view of a head gimbal assembly, in accordance with an embodiment of the present invention.

With reference now to FIG. 2, an actuator arm configuration 200 in accordance with an embodiment of the present invention is shown. An actuator arm 210 is coupled to a head gimbal assembly 220 that comprises a magnetic read/write head (not shown). In the embodiment shown, the magnetic read/write transducer or head is coupled to a slider 221 that is secured to a flexure 222, which is flexibly mounted to a lead suspension 223. In one embodiment, the slider 222 is bonded to the end of the lead suspension 223. Movement (illustrated by arrows 230) of the actuator arm 210 moves the head gimbal assembly 220 relative to the magnetic storage medium 120 such that read/write head can magnetically read data from and/or magnetically write data to different points along the surface of the magnetic storage medium 120.

A voice coil 212, free to move within a conventional voice coil motor magnet assembly (not shown), is also mounted to the actuator arm 210 opposite the head gimbal assembly 220. Movement of the actuator arm 210 (indicated by arrows 230) causes the head gimbal assembly 220 to move along radial arcs across tracks on the magnetic storage medium 120 until the magnetic read/write head settles on its set target track. In one embodiment, the controller 150 is configured to move the head gimbal assembly 220 along these radial arcs. However, it should be understood by those skilled in the art that each of the plurality of parallel actuator arms 141 has its own head gimbal assembly. Thus, in another embodiment, the head gimbal assemblies of the plurality of parallel actuator arms 141 operate in a conventional manner and move in unison with one another, unless drive 100 uses multiple independent actuators (not shown) comprising actuator arms configured to move independently of one another.

With reference still to FIG. 2, the actuator arm 210 has extending from it at least one lead suspension 223. In one embodiment, the lead suspension 223 is a cantilevered electrical lead suspension (ELS). In another embodiment, the lead suspension 223 is an integrated lead suspension (ILS) that is formed by a subtractive process. In yet another embodiment, the lead suspension 223 may be formed by an additive process, such as a Circuit Integrated Suspension (CIS). In a further embodiment, the lead suspension 223 may be a Flex-On Suspension (FOS) attached to base metal or it may be a Flex Gimbal Suspension Assembly (FGSA) that is attached to a base metal layer. However, it should be understood by those skilled in the art that the lead suspension 223 may be any form of lead suspension that can be used in a Data Access Storage Device (DASD), such as a HDD.

The lead suspension 223 has a spring-like quality, which biases or presses the air-bearing surface of the slider 221 against the magnetic storage medium 120 to cause the slider 221 to fly at a precise distance from the disk. The lead suspension 223 has a hinge area that provides for the spring-like quality, and a flexing interconnect (or flexing interconnect) that supports read and write traces through the hinge area.

With reference still to FIG. 2, movement (indicated by arrows 230) of the actuator arm 210 about a pivot assembly 211 causes the head gimbal assembly 220 to move along radial arcs across tracks on the magnetic storage medium 120 until the heads settle on their set target tracks. In one embodiment, the controller 150 of the hard disk drive 100 is configured to selectively move the actuator arm 210 relative to the magnetic storage medium 120. The magnetic read/write transducer or head coupled to the slider 221 read data from and magnetically write data to data arrays comprising radially spaced data information tracks located on the surface of the magnetic storage medium 120.

Depopulated Fly-Height Control

Generally, a HDD may be manufactured such that it is "fully populated" (e.g., the HDD may be configured to utilize a total of ten heads for five disks). However, in an effort to reduce costs, many manufacturers may create HDDs utilizing a reduced number of heads and discs. In such a case, the HDD may have a "depopulated" configuration. For example, a depopulated HDD may comprise five heads for three discs.

Oftentimes, after manufacturing a HDD, one head or disk surface will operate below par. That is, a HDD might have an individual bad read/write head in a head stack assembly, or a disk surface that has too many defects to be sufficiently operable. In such cases, the faulty component can simply be reworked, but there is often a high cost associated with the reworking and scrapping of materials. Alternatively the HDD may be sold as a lower capacity drive, wherein the faulty head or disk is not utilized. For instance, instead of reworking an 8-head HDD, the device can simply be sold as a 4-head model. In this manner, a manufacturer can take a 200 gigabyte drive and sell it as a 100 gigabyte drive in which half of the heads are not utilized, because one of these heads is not working properly. This is an example of a "logically depopulated" configuration.

However, logically depopulating a drive does not necessarily result in a greater degree of mechanical reliability. This is due in large part to the fact that each magnetic read/write head in a HDD is characterized by an independent and inherent failure probability. This means that the inactive or disabled heads, although not presently reading or writing data to the magnetic storage medium, still affect the overall reliability of the system. A contributing factor to the failure probability of a read/write head is its proximity to the magnetic disk in the disk pack that the head is reading data from and writing data to. If a slider in which the read/write head is housed flies too close to the magnetic disk, the slider and disk may collide, causing the head or disk to fail. Indeed, it is often the case that if one head fails, the entire drive will fail. This means that, in the previous example, when the 8-head, 200 gigabyte drive is sold as a 100 gigabyte drive in which only 4 heads are utilized, the remaining unused heads still contribute to the drive's inherent failure probability. Thus, there exists a reliability concern with having unused or disabled heads located in such close proximity to the disk.

Figure 3:
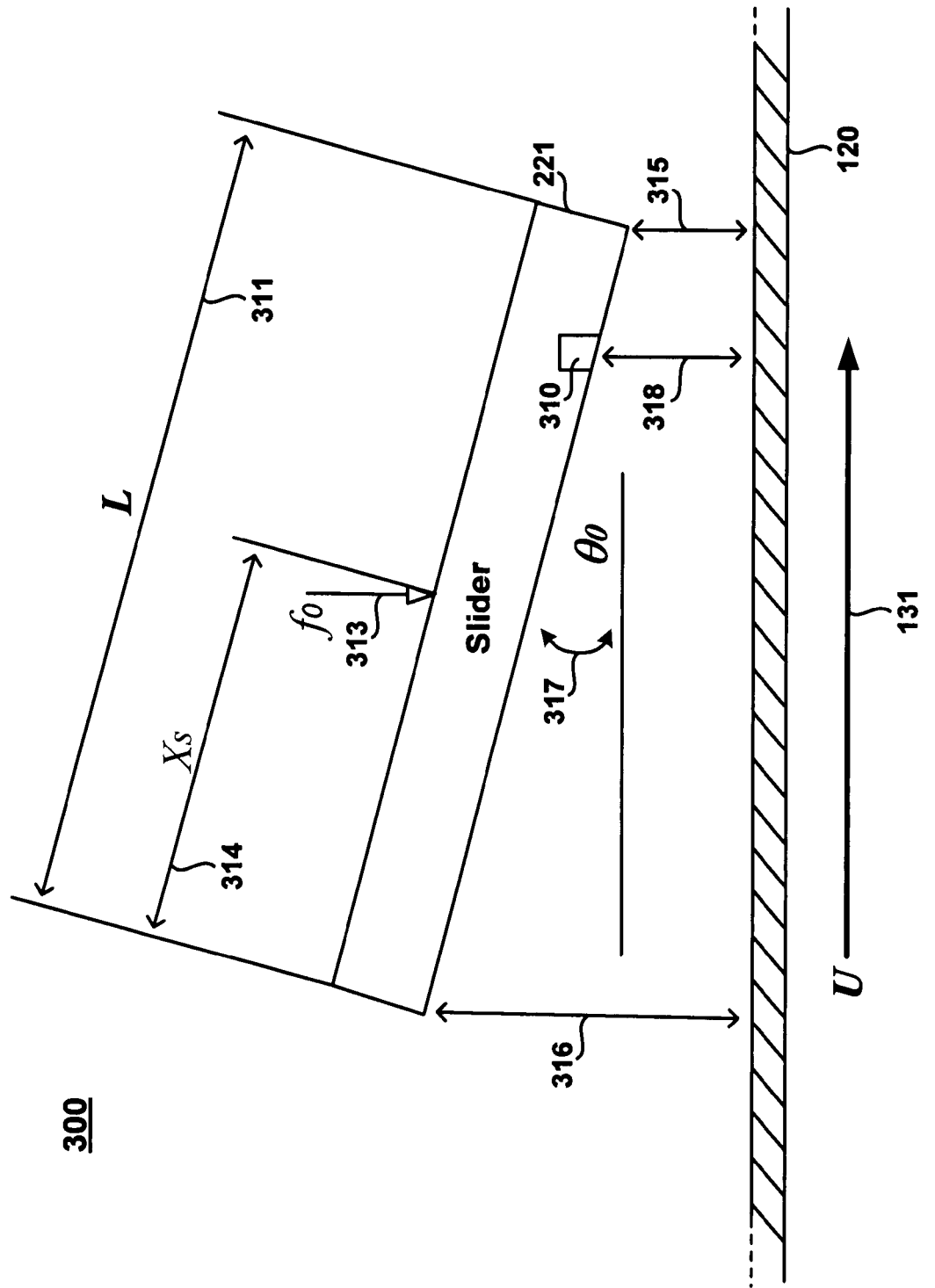
FIG. 3 is a cross-sectional view of a slider in relation to a magnetic recording medium, in accordance with an embodiment of the present invention.

An embodiment of the present technology solves this problem by allowing those skilled in the art to logically depopulate a drive while simultaneously increasing drive reliability. With reference now to FIG. 3, a fly-height configuration 300 in accordance with an embodiment of the present invention is shown. The fly-height configuration comprises a slider 221 that is coupled to a magnetic read/write head 310. The slider 221 has a finite length 311 and is suspended by a flexure 222 at a fixture point 313 that is located a pre-defined distance 314 from an end of the slider 221. The slider 221 is suspended from the flexure 222 such that a horizontal axis associated with the finite length 311 is skewed relative to a magnetic storage medium 120 according to a normalized pitch angle 317 of the slider 221. This skewed orientation causes the leading edge of the slider 221 to fly above the magnetic storage medium 120 according to a leading fly-height. Similarly, the trailing edge of the slider 221 flies above the magnetic storage medium 120 according to a trailing fly-height 315. Finally, the magnetic read/write head 310 flies above the magnetic storage medium 120 at a transmission fly-height 318.

With reference still to FIG. 3, the magnetic read/write head 310 is configured to read data from and magnetically write data to data arrays comprising radially spaced data information tracks located on the surface of the magnetic storage medium 120. When the transmission fly-height 318 is smaller, the magnetic read/write head 310 is located closer to these data arrays, which decreases the space required between tracks on the magnetic storage medium 120, and therefore increases data storage capacity in drive 100.

However, when this transmission fly-height 318 is smaller, there is also an increased probability of a communication between the magnetic read/write head 310 and the magnetic storage medium 120 being corrupted. For example, the trailing fly-height may be closer to the magnetic storage medium than the transmission fly-height, such that lowering the slider 221 relative to the magnetic storage medium by a distance equal to the trailing fly-height 315 causes the slider 221 to collide with the magnetic storage medium 120. As a second example, operation of the disk drive 100 may result in vibrations in the various components, such as the actuator arm 210 and head gimbal assembly 220, which can cause the slider 221 and the magnetic storage medium 120 to collide.

Figure 4:
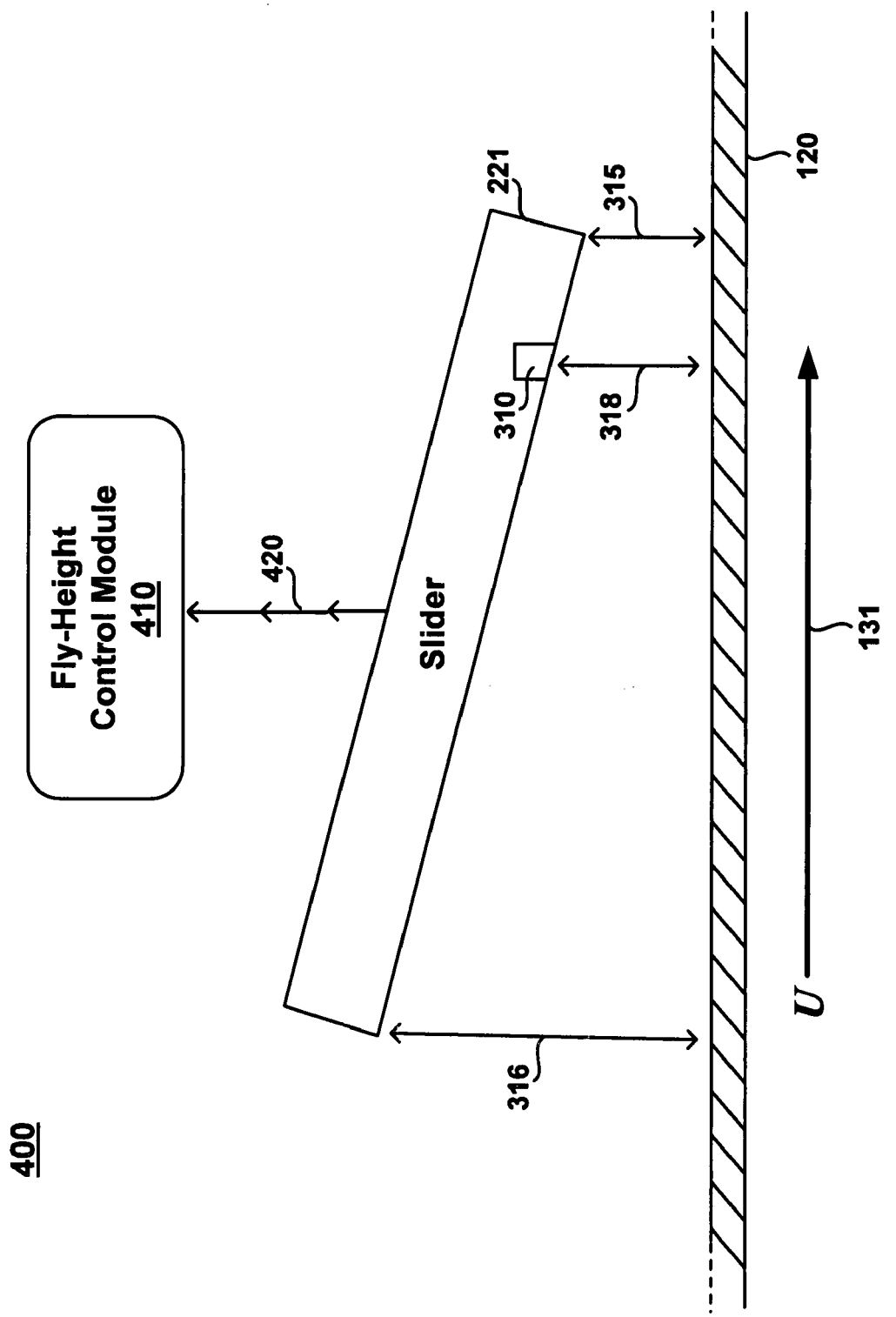
FIG. 4 is a cross-sectional view of a fly-height control module, in accordance with an embodiment of the present invention.

With reference now to FIG. 4, an embodiment of the present invention is disclosed that addresses this reliability concern by providing a system 400 for logically depopulating a drive 100 while increasing its inherent reliability. The slider 221 is coupled to a fly-height control module 410 that is configured to move the slider 221 in a direction 420 relative to the magnetic storage medium 120 when the read/write head is disabled such that the transmission fly-height 318 of the magnetic read/write head 310 is increased. This increase in the transmission fly-height 318 causes the slider 221 to fly at a greater distance relative to the magnetic storage medium 120, which lowers the probability of the slider 221 and the magnetic storage medium 120 colliding.

Thus, an embodiment of the present technology may be configured to focus on increasing a fly-height associated with a disabled magnetic read/write head such that overall system performance may be increased. For example, as previously explained, a manufacturer may sell an 8-head, 200 gigabyte drive as a 100 gigabyte drive in which only 4 of the 8 read/write heads are utilized. However, since the unused heads still contribute to the drive's inherent failure probability, disabling these heads does not improve mechanical reliability. In other words, there exists a reliability concern with having these unutilized heads located in such close proximity to the disk. However, the present embodiment may be implemented so as to address this concern by increasing a fly-height associated with the disabled heads so as to decrease the inherent failure probability of the drive. Thus, implementation of principles of the present technology in the aforementioned example would cause a drive using 4 of 8 heads to be more reliable than one using all 8 because the inherent failure probability of the depopulated drive will now be less than before. The present embodiment is therefore in contrast to past systems pursuant to which, when a magnetic read/write head was disabled, there was no fly-height differentiation between those heads that were operable and those that were non-operable.

Indeed, prior implementations of fly-height control were passive regarding their concern for the fly-height of a disabled read/write head. For example, prior implementations of thermal fly-height control (TFC) were used to decrease a fly-height such that a magnetic read/write head flies closer to a magnetic storage medium. These implementations were concentrated on causing a surface of the slider to protrude toward the disk surface such that the data arrays of the magnetic disk could be located closer together, which helped to maximize the potential storage capacity of a magnetic storage medium. However, in the case of a magnetic read/write head that has been rendered disabled, decreasing the fly-height further degrades system reliability since there will be a greater probability of a collision between the magnetic storage medium and the slider. In contrast, an embodiment of the present technology focuses on increasing overall system reliability by increasing a fly-height associated with a disabled magnetic read/write head.

In one embodiment, a user recognizes that communication between the magnetic read/write head 310 and the magnetic storage medium 120 is not properly occurring, and the user then communicates to the fly-height control module 410 to increase the transmission fly-height 318. For instance a systems technician could perform a system diagnostic test of the drive 100 and determine that the magnetic read/write head 310 is not functioning properly. In another example, the technician could determine that the magnetic read/write head 310 is functioning properly, but that the integrity of the magnetic storage medium 120 is corrupted, or that the magnetic storage medium 120 is otherwise operating sub-par. The technician will then decide that, since the magnetic read/write head 310 is not properly communicating with the magnetic storage medium 120, the read/write head 310 should be disabled. Once the read/write head is disabled, keeping the transmission fly-height constant does nothing to increase the reliability with which the drive 100 operates. Thus, the technician can send a signal to the fly-height control module 410 that causes the module 410 to increase the transmission fly-height 318, which increases the reliability of the drive 100.

In another embodiment, the drive 100 is configured to recognize when the magnetic read/write head 310 has been disabled. The drive 100 will then automatically send a signal to the fly-height control module 410 that causes the module 410 to increase the transmission fly-height 318, which increases the reliability of the drive 100. For example, in one embodiment, the controller 150 is configured to recognize when the magnetic read/write head 310 is disabled, and then sends an electronic signal to the fly-height control module 410 directing the module 410 to increase the transmission fly-height 318.

However, it should be understood by those skilled in the art that principles of the present technology are not limited to a manual assessment of the communication efficiency of the components of a drive, or to methods of manual head disablement. For instance, a further embodiment according to principles of the present invention could be implemented in which a separate computer, such as a computer that is utilizing the magnetic storage medium 120 of the drive 100, assesses the efficiency of the communication between the magnetic read/write head 310 and the magnetic storage medium 120. The computer would then send a signal to the fly-height control module 410 directing the module 410 to increase the transmission fly-height 318.

In an alternative embodiment, the drive 100 is configured to assess the communication between the magnetic read/write head 310 and the magnetic storage medium 120. The drive 100 is further configured to determine that the magnetic read/write head 310 is functioning properly, but that the integrity of the magnetic storage medium 120 is corrupted, or that the magnetic storage medium 120 is otherwise operating sub-par. The drive 100 then decides that, since the magnetic read/write head 310 is not properly communicating with the magnetic storage medium 120, the read/write head 310 should be disabled. The drive 100 would then automatically disable the read/write head, and send a signal to the fly-height control module 410 that causes the module 410 to increase the transmission fly-height 318, which would increase the reliability of the drive 100. Thus, an embodiment of the present invention allows the drive 100 to assess and respond to its own reliability concerns.

In an alternative embodiment, the fly-height control module 410 is itself configured to recognize when the magnetic read/write head 310 has been disabled. For instance, the fly-height control module 410 could be configured to monitor the data that is being transmitted from the read/write head 310 to a computer implementing the drive. In one example, the fly-height control module 410 implements a checksum or cyclic redundancy check to determine whether the transferred data comports with a data transfer protocol that is implemented by the drive 100. If the fly-height control module 410 determines that the transferred data does not comport with such an implemented protocol, the fly-height control module 410 will automatically disable the magnetic read/write head 310 and move the slider 221 in a direction 420 relative to the magnetic storage medium 120 such that the transmission fly-height 318 of the magnetic read/write head 310 is increased. Such automatic policing implementations would present a practical utility with regard to quickly assessing and correcting weaknesses in the drive 100.

Deformation

It should be understood by those skilled in the art that there exists a myriad of possibilities for implementing various embodiments of the present invention. For example, in one embodiment, the fly-height control module 410 is configured to implement a permanent or temporary means of mechanically changing any number of parts that support and/or suspend the magnetic read/write head 310. For instance, the fly-height control module 410 may be configured to shorten a length associated with the flexure 222 such that the slider 221 is suspended at a greater distance above the magnetic storage medium 120. This increase in the distance between the slider 221 and the magnetic storage medium 120 will lessen the mechanical reliability concern associated the magnetic read/write head 310 when the head 310 is rendered disabled. Similarly, in another embodiment, the lead suspension 223 is raised such that the fly-height 318 between the magnetic read/write head 310 and the magnetic storage medium 120 is increased.

Another embodiment of the present technology teaches that a component of the actuator arm 141 may be deformed such that the transmission fly-height 318 associated with the magnetic read/write head 310 is increased. For instance, in one embodiment, the actuator arm 210 is deformed such that a portion of the actuator arm 210 is raised relative to the magnetic storage medium 120. Since the actuator arm 210 is coupled to the slider 221 by means of the lead suspension 223 and flexure 222, raising the actuator arm 210 causes the slider 221, and consequently the magnetic read/write head 310, to also be raised relative to the magnetic storage medium 120. In another example, a portion of the pivot assembly 211 is deformed such that the actuator arm 210 and head gimbal assembly 220 are raised relative to the magnetic storage medium 120. By raising the head gimbal assembly 220, the position of the read/write head 310 is changed such that a fly-height associated with the slider 221 is increased.

In one embodiment of the present invention, the position of the slider 221 relative to the magnetic storage medium 120 is permanently changed such that the slider 221 and magnetic read/write head 310 are both nonfunctional and far enough away from the magnetic storage medium so as to lessen mechanical reliability concerns associated with the effect of the inherent failure probability of the magnetic read/write head 310 on the drive 100. For example, in one embodiment, the lead suspension 223 comprises a material that is capable of being permanently deformed such that deforming the material causes a distance between the slider 221 and the magnetic storage medium 120 to increase. Implementing this embodiment according to principles of the present technology will cause the transmission fly-height to be permanently increased.

In yet another embodiment, the fly-height 318 is increased by implementing a flexure 222 that is capable of being deformed. For example, the flexure 222 could be configured such that the deformation process causes the flexure to constrict or condense such that it pulls the slider 221 away from the magnetic storage medium 120, causing the leading fly-height 316, trailing fly-height 315 and transmission fly-height 318 to all be increased. In a second example, the flexure 222 is configured to decrease the normalized pitch angle 317 of the slider 221 such that the tail edge, but not the leading edge, of the slider 221 is raised relative to the magnetic storage medium 120, thus causing the minimum fly-height, typically the trailing fly-height 315 or the transmission fly-height 318, to increase. Thus, it should be understood by those skilled in the art that a fly-height associated with the slider 221 can be increased by raising the slider 221 away from the magnetic storage medium 120, or by adjusting an angle relative to which the slider 221 flies above the magnetic storage medium 120.

In another embodiment, the slider 221 is itself configured such that it is capable of being deformed. For example, with reference to FIG. 3, the slider 221 could be deformed such that the portion of the slider 221 in which the magnetic read/write head 310 is located is raised relative to the magnetic storage medium, thus increasing the transmission fly-height 318. In a second example, the trailing edge of the slider 221 is deformed such that the portion of the trailing edge facing the magnetic storage medium 120 is raised relative to the magnetic storage medium, thus increasing the trailing fly-height height 315; this could be achieved by a deformation of crown or curvature, among other possibilities. In an alternative embodiment, deforming the slider 221 causes the normalized pitch angle 317 to decrease such that the trailing fly-height 315 and the transmission fly-height 318 are increased.

Thermal Fly-Height Control

Generally, the distance between a slider and a disk surface is the same for populated, depopulated and reworked drives. Past implementations of thermal fly-height control (TFC) comprised a thermal expansion (such as in the slider material) that caused a surface of the slider to protrude toward the disk surface. The purpose of these past implementations of TFC is that a disk can be designed such that its data arrays are located closer together, which translates into higher density tracks, and consequently, an increased level of data storage capacity. However, there is a reliability concern associated with these implementations of TFC because moving the slider closer to the disk surface increases the probability of disk and head failure. Indeed, regarding traditional TFC, the aforementioned protrusion is oftentimes almost half the distance of the relational fly-height, and a decrease in such spacing is not linearly proportional to a decrease in reliability. Rather, there is an exponential relationship between these two factors such that as the slider moves closer to the disk surface, the drive's reliability exponentially decreases.

Figure 5:
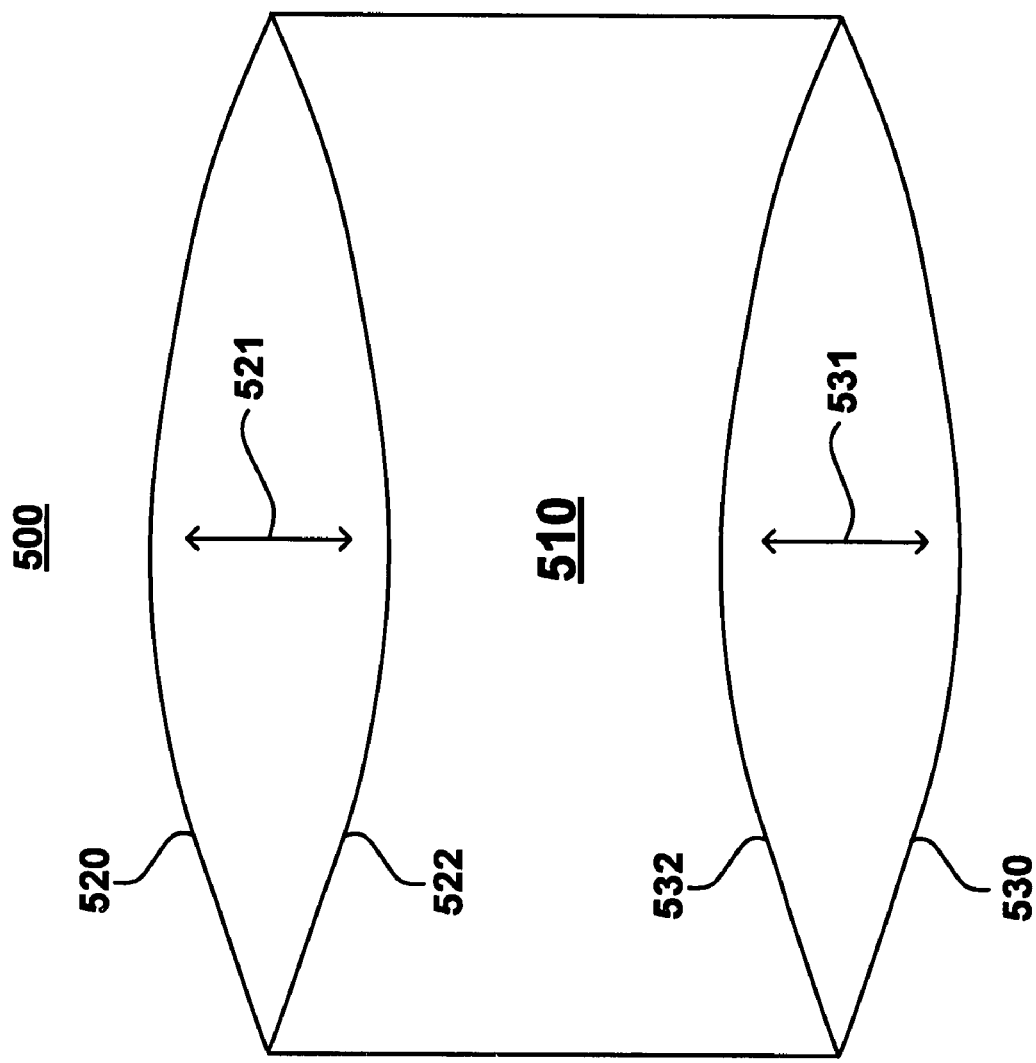
FIG. 5 is a plan view of a thermal-sensitive substrate, in accordance with an embodiment of the present invention.

An embodiment of the present invention addresses this concern by allowing a person skilled in the art to increase a fly-height associated with a magnetic read/write head so as to increase overall system performance and reliability. With reference to FIG. 5, a thermal fly-height control system 500 is shown wherein a thermal-sensitive fly-height gain substrate 510 is configured to couple with a head stack assembly (HSA), not shown, in a HDD. The thermal-sensitive fly-height gain substrate 510 of the present embodiment is configured to change shape in response to a change in temperature. For instance, in the embodiment shown in FIG. 5, the thermal-sensitive fly-height gain substrate 510 is characterized as having an expanded top edge 520 and an expanded bottom edge 530. When the thermal-sensitive fly-height gain substrate 510 experiences a change in temperature, the expanded edges 520, 530 of the substrate 510 are constricted by distances 521 and 531, respectively, such that the shape of the substrate 510 is changed. In the illustrated embodiment, the thermal-sensitive fly-height gain substrate 510 is then characterized as having a constricted top edge 522 and a constricted bottom edge 532.

The foregoing notwithstanding, it should be appreciated by those skilled in the art that the embodiment illustrated in FIG. 5 is simply an example of how principles of the present invention may be implemented. There exists various possibilities of changing the shape of the thermal-sensitive fly-height gain substrate 510, and the disclosed examples are not in any way meant to limit various implementations of various embodiments of the present invention. For instance, in a further embodiment of the present invention, only a portion of the substrate 510 is configured to change shape in response to change in temperature. To illustrate, the system 500 of FIG. 5 may be implemented such that the expanded bottom edge 530 is moved by a distance 531, but wherein the top expanded edge 520 does not move in response to a change in temperature.

In an alternative embodiment, the thermal-sensitive fly-height gain substrate 510 is configured to expand in response to a change in temperature. According to this embodiment, and with reference again to FIG. 5, the thermal-sensitive fly-height gain substrate 510 is characterized as having a constricted top edge 522 and a constricted bottom edge 532. When the thermal-sensitive fly-height gain substrate 510 experiences a change in temperature, the constricted edges 522, 532 of the substrate 510 are expanded by distances 521 and 531, respectively, such that the shape of the substrate 510 is changed. Thus, pursuant to the present embodiment, the thermal-sensitive fly-height gain substrate 510 is then characterized as having an expanded top edge 520 and an expanded bottom edge 530.

It should be understood by those skilled in the art, however, that the aforementioned embodiments are only examples of how the thermal-sensitive fly-height gain substrate 510 may be configured to function. Principles of the present invention teach that the thermal-sensitive fly-height gain substrate 510 is further configured to change shape in response to a change in temperature, but the possibilities in which the substrate 510 may be configured to change shape are virtually endless. In addition, a vast number of materials having heat sensitive or reactive characteristics may be implemented when practicing the various embodiments discussed herein. It is understood that the thermal-sensitive fly-height gain substrate 510 is not limited to any particular material or substance as long as a reaction to a change in temperature is capable of taking place. Furthermore, various materials and configurations may be implemented according to principles of the present technology such that the change in temperature is either an increase or a decrease in temperature.

Various detailed embodiments for implementing the thermal-sensitive fly-height gain substrate 510 will now be discussed in detail so as to provide a better understanding of how a thermal fly-height control system 500 might be implemented pursuant to principles of the present invention. It is understood that the following detailed embodiments are simply exemplary, and are not meant to constrict the present invention to the disclosed configurations and manners of implementation.

In one embodiment implementing principles of the present technology, the thermal-sensitive fly-height gain substrate 510 is coupled to the magnetic read/write head 310. When the thermal-sensitive fly-height gain substrate 510 experiences a change in temperature, the expanded bottom edge 532 of the substrate 510 constricts or condenses by a distance 531. Such constriction or condensing causes a portion of the read/write head 310 to be raised relative to the magnetic storage medium 120, which increases the fly-height 318 of the read/write head 310.

In an alternative embodiment, a portion of the magnetic read/write head 310 comprises the thermal-sensitive fly-height gain substrate 510. In this manner, when the magnetic read/write head 310 experiences a change in temperature, the thermal-sensitive fly-height gain substrate 510 changes shape. This change in shape of the substrate 510 simultaneously causes a change in shape of the read/write head 310, which causes a portion of the read/write head 310 to be raised relative to the magnetic storage medium 120.

Thus, it should be understood by those skilled in the art that the thermal-sensitive fly-height gain substrate 510 may be positioned either inside or outside the magnetic read/write head 310 such that the fly-height 318 of the read/write head 310 is increased in response to a requisite change in temperature experienced by the substrate 510. However, it should be noted that when the thermal-sensitive fly-height gain substrate 510 is configured to change shape in response to an increase in temperature, the requisite change in temperature needed to promote such a change in shape is optimally configured to be an increase in temperature that is greater than the general increase in temperature experienced by the components of a HDD during normal operation. In this manner, premature depopulation may be avoided.

In an alternative embodiment, a second thermal-sensitive fly-height gain substrate is implemented in the head stack assembly (HSA) of the drive 100. For instance, the second thermal-sensitive fly-height gain substrate may be coupled to the lead suspension 223 while the first thermal-sensitive fly-height gain substrate 510 is coupled to the slider 221. Both substrates are configured to change shape in response to a change in temperature such that a change in shape of both substrates increases the fly-height 318 to a level that would not have been achieved with only the first thermal-sensitive fly-height gain substrate 510.

Figure 6:
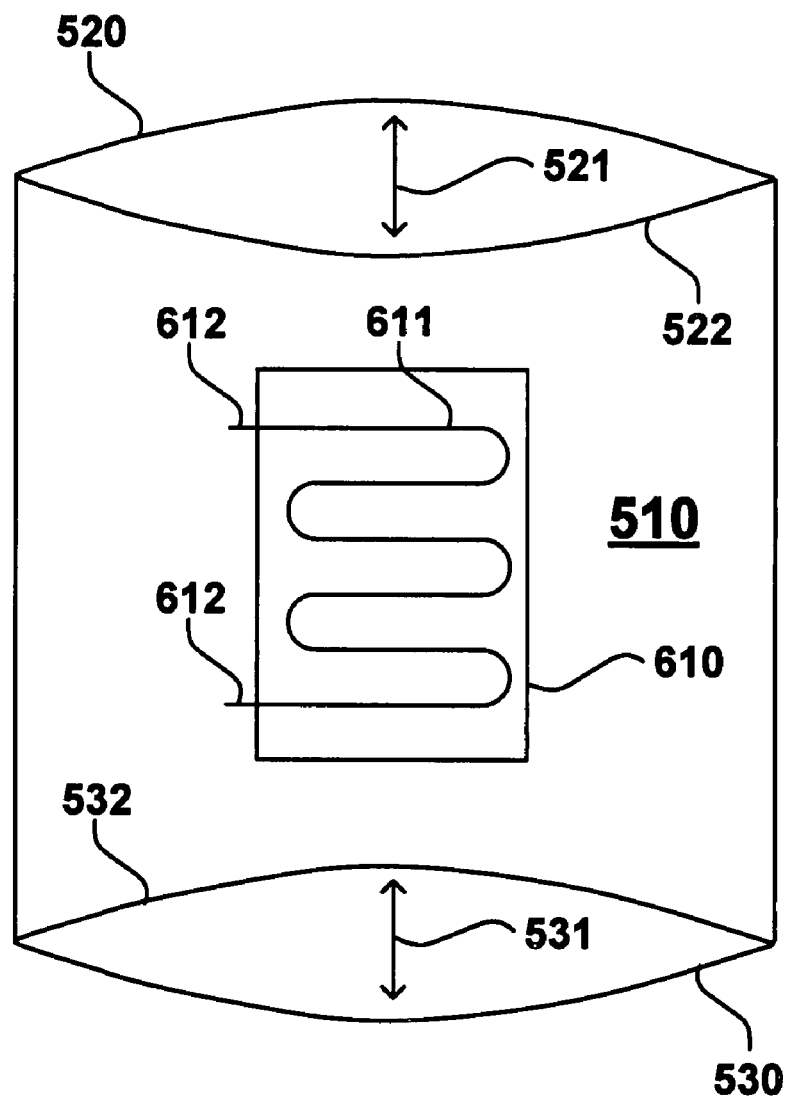
FIG. 6 is a plan view of a temperature adjustment module, according to an embodiment of the invention, which may be implemented in the thermal-sensitive substrate of FIG. 5.

With reference now to FIG. 6, a system 600 for implementing a temperature adjustment module 610 according to an embodiment of the present technology is illustrated. The temperature adjustment module 610 is configured so as to be coupled to the thermal-sensitive fly-height gain substrate 510, and is further configured to cause the temperature of the substrate 510 to change. For instance, in one embodiment the temperature adjustment module 610 is located outside the thermal-sensitive fly-height gain substrate 510 and is coupled to the substrate 510 by a thermal conductive medium that delivers a change in temperature to the substrate 510. In an alternative embodiment, such as that shown in FIG. 6, the temperature adjustment module 610 is positioned inside the thermal-sensitive fly-height gain substrate 510 such that the temperature adjustment module 610 generates a change in temperature that is then directly transferred, through the walls of the module 610, to the substrate 510.

In another embodiment, the temperature control module 610 comprises a heating element 611 that generates a change in temperature. For example, the heating element 611 may be an electrical heating coil having electrical leads 612, as shown in FIG. 6. When a voltage is applied to the electrical leads 612, an electrical current is driven through the coil causing it to convert the electrical current into thermal energy, which is discharged, in the form of heat, to the thermal-sensitive fly-height gain substrate 510. The substrate 510 would be configured to expand, constrict or condense in response to the discharged heat, depending on where the substrate 510 is located in the head stack assembly (HSA). In one embodiment, the amount of voltage that is applied to the electrical leads 612 may be adjusted in order to cause slight variations in the fly-height 318. In this way, a voltage can be controlled which then controls the spacing of components of a drive 100 within a highly toleranced section of the head gimbal assembly 220.

Figure 7:
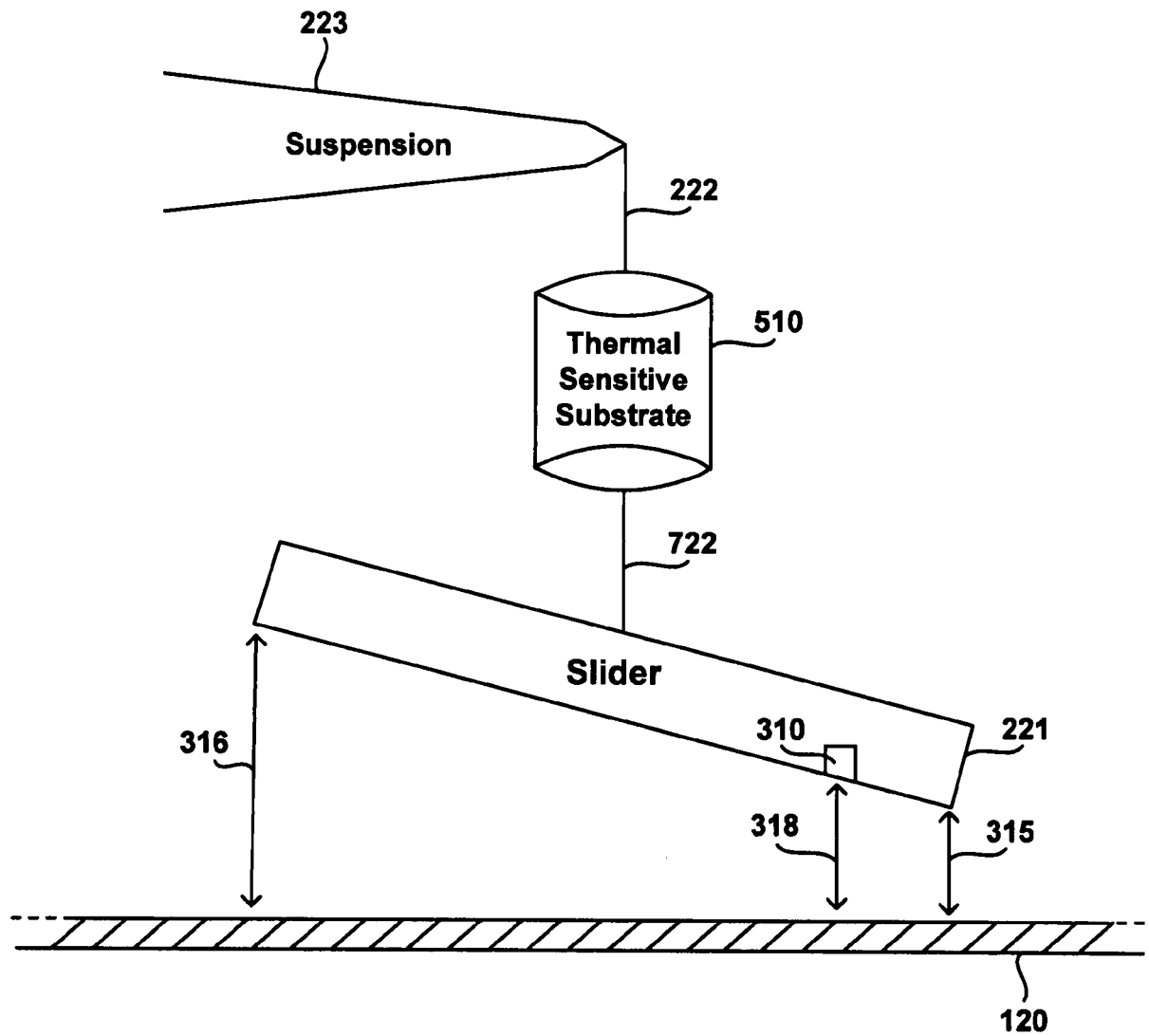
FIG. 7 is a plan view of a system implementing the thermal-sensitive substrate of FIGS. 5 and 6, in accordance with an embodiment of the present invention.

With reference now to FIG. 7, a system 700 is shown in which the thermal-sensitive fly-height gain substrate 510 is located within the head gimbal assembly 220 according to an embodiment of the present invention. The thermal-sensitive fly-height gain substrate 510 is coupled to the lead suspension 223 and the slider 221. In the illustrated embodiment, the substrate 510 is shown as being coupled between the lead suspension 223 and the slider 221. However, it should be understood that this is only one example of how the thermal-sensitive fly-height gain substrate 510 may be configured within the head gimbal assembly 220.

With reference still to FIG. 7, the substrate 510 is indirectly coupled to the lead suspension 223 by being directly attached to the fixture 222. In another example, a second fixture 722 is added to the system 700. The second fixture 722 is attached to the thermal-sensitive fly-height gain substrate 510 and the slider 221 such that the substrate 510 and slider 221 are indirectly coupled to one another. The use of one or more fixtures depends on the needs of one implementing an embodiment of the present invention. However, it is understood that such fixtures are not necessary to practice the embodiment illustrated in FIG. 7. Indeed, the thermal-sensitive substrate 510 may be located between the lead suspension 223 and the slider 221, but directly coupled to each. An example of one of the many possibilities is a lever arrangement where the more common thermally expanding materials could push down away from the suspension 223 toward the substrate 510 against a lever, the opposite end of which would lift the slider 221 away from the substrate 510, thus increasing the minimum fly-height, typically the trailing fly-height 315 or the transmission fly-height 318.

With reference still to FIG. 7, the thermal-sensitive fly-height gain substrate 510 is configured to constrict or condense in response to a change in temperature. Thus, when the substrate 510 either constricts or condenses, the substrate 510 creates a vertical force that acts directly upon the second fixture 722, and indirectly upon the slider 221. This vertical force causes the second fixture 722 to be pulled in a direction away from the magnetic storage medium 120. The tensile strength of the second fixture 722 causes this vertical force to act upon the slider, to which the second fixture 722 is directly coupled. Thus, the system 700 causes the slider 221 to move in a direction away from the magnetic storage medium 120 such that a fly-height 318 associated with the magnetic read write head 310 is increased.

With reference again to the head gimbal assembly 220 of FIG. 2, the slider 221 is coupled to the fixture 222, which is itself coupled to the lead suspension 223. Pursuant to another embodiment, the thermal-sensitive fly-height gain substrate 510 is coupled directly to the slider 221. For example, the substrate 510 could be, embedded within the slider 221, and configured to constrict or condense in response to a change in temperature. When the read/write head 310 is disabled, a change in temperature would be generated which would be translated to the thermal-sensitive fly-height gain substrate 510. The substrate 510 would then constrict or condense, which would cause a portion of the slider 221 to be slightly deformed such that the read/write head 310 is raised relative to the magnetic storage medium 120. In yet another embodiment, the thermal-sensitive fly-height gain substrate 510 is configured so as to be located between the lead suspension 223 and the fixture 222, such that a constriction or condensing of the substrate 510 would cause the fixture 222, and therefore the slider 221, to be raised relative to the magnetic storage medium, thus increasing a fly-height 318.

Figure 8:
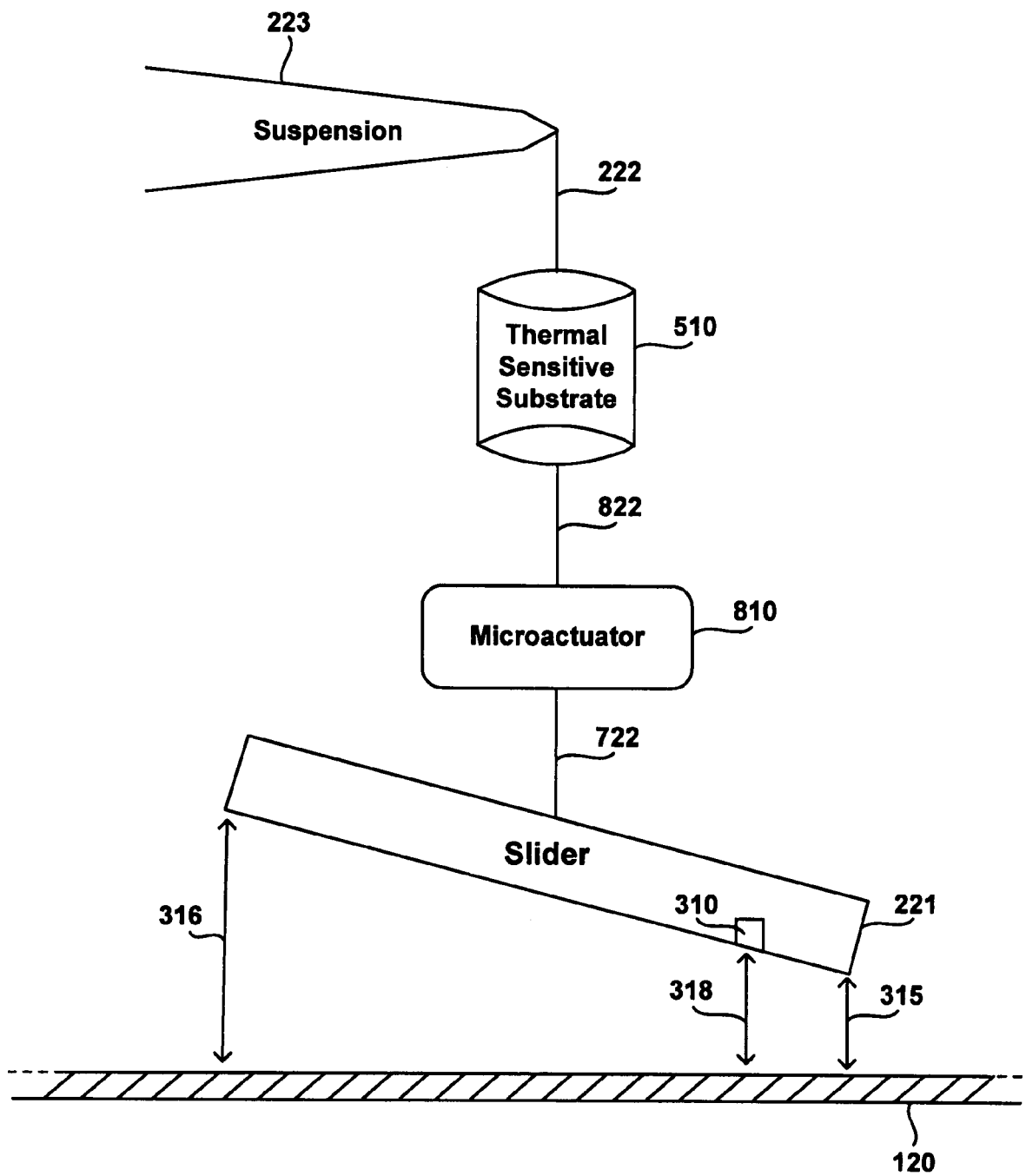
FIG. 8 is a plan view of a system implementing a second actuator, in accordance with an embodiment of the present invention.

With reference now to FIG. 8, a system implementing a second actuator, in accordance with an embodiment of the present invention, is shown. A secondary actuator, such as a microactuator 810, is added in close proximity to the slider 221 to mitigate unwanted relative motion between the slider 221 and the surface of the magnetic storage medium 120. Modern microactuators typically have a relatively small actuation stroke length (e.g., plus and minus one micron). Such microactuators allow actuator devices to realize a quicker response to relative motion between a slider and a disk surface as opposed to moving the entire head stack assembly (HSA).

In the system 800, the microactuator 810 is coupled between the lead suspension 223 and the slider 221. For instance, in the embodiment illustrated in FIG. 8, the microactuator 810 is attached to the second fixture 722 such that the microactuator is indirectly coupled to the slider 221. The microactuator is also coupled to the thermal-sensitive fly-height gain substrate 510 by means of a third fixture 822. The substrate 510 is in turn coupled to the lead suspension 223 by means of the first fixture 222. Thus, in the illustrated embodiment, a change in shape of the thermal-sensitive fly-height gain substrate 510 will cause the third fixture 822 to be raised relative to the magnetic storage medium 120, which will in turn raise the microactuator 810 and second fixture 722. Consequently, the slider 221 and magnetic read/write head 310 will also be raised relative to the magnetic storage medium 120, thus causing the fly-height 318 to increase.

In one embodiment, the fly-height is not increased until the magnetic read/write head 310 has been disabled. When the read/write head is still operable, the microactuator 810 serves to mitigate unwanted relative motion between the slider 221 and the surface of the magnetic storage medium 120. However, when the magnetic read/write head 310 has been disabled, neither the microactuator 810 nor the disabled read/write head 310 continue to serve a useful application because the read/write head 310 no longer magnetically reads data from or magnetically writes data to the magnetic storage medium 120. Therefore, raising the disabled read/write head 310 relative to the magnetic storage medium 120 does not degrade communication between the read/write head 310 and the magnetic storage medium 120 since such communication is no longer taking place once the read/write head 120 is disabled. Rather, this system 800 increases overall system performance by allowing the magnetic read/write head to function more efficiently when in operation, and by increasing the reliability of the drive 100 when the read/write head 310 is rendered inoperable.

However, it should be appreciated by those skilled in the art that the illustrated embodiment of FIG. 8 is only one method of configuring the system 800. According to an alternative embodiment, the microactuator 810 is coupled between the lead suspension 223 and the thermal-sensitive fly-height gain substrate 510. One or more fixtures may be used to couple the components of the system 800 together, but are not necessarily required.

In another embodiment, the microactuator is coupled to a fixture 722, and the fixture 722 is coupled to the slider 221. Further, the fixture 722 is itself comprised of the thermal-sensitive fly-height gain substrate 510 such that a change in temperature causes the fixture 722 to constrict or condense. The inward force associated with the constriction or condensing of the fixture 722 causes the slider 221 to be raised relative to the magnetic storage medium 120.

In an alternative embodiment, the microactuator 810 is coupled between the lead suspension 223 and the slider 221, and the slider 221 itself comprises the thermal-sensitive fly-height gain substrate 510. Thus, when the slider 221 experiences a change in temperature, the shape of the slider 221 changes such that the magnetic read/write head 310 is raised relative to the magnetic storage medium 120, thus increasing the fly-height 318. In a further embodiment, the slider 221 comprises the thermal-sensitive fly-height gain substrate 510 and the temperature adjustment module 610 such that the change in temperature is generated from within the slider 221. This latter embodiment provides a technique for implementing principles of the present technology so as to achieve the desired increase in the fly-height 318 while simultaneously conserving space in the drive 100 by combining certain components of the system 800.

Read/Write Head Disablement and Repositioning

Figure 9:
FIG. 9 is flowchart of a process for increasing a fly-height of a magnetic read/write head in accordance with an embodiment of the present invention.

With reference now to FIG. 9, a process for increasing a fly-height of a magnetic read/write head in accordance with an embodiment of the present invention is shown. The process comprises determining that a read/write head in a hard disk drive (HDD) is disabled 910, and increasing a fly-height associated with the disabled read/write head with respect to a fly-height associated with other read/write heads in the hard disk drive (HDD) 920. For example, the process could be implemented by one skilled in the art such that a fly-height associated with a read/write head that is coupled to a head stack assembly (HSA) is increased when the read/write head is disabled. This process increases reliability of the hard disk drive (HDD) because the disabled read/write head will be raised relative to a magnetic storage medium in the hard disk drive (HDD), thus lessening the probability of the read/write head colliding with the storage medium and causing the hard disk drive (HDD) to crash.

It should be appreciated by one skilled in the art that various methods exist for implementing the process of FIG. 9. For example, the process may be implemented such that a fly-height associated with the disabled read/write head is increased 920 by raising an actuator arm coupled to the disabled read/write head. For instance, when the read/write head is in operation, the actuator arm could be configured to rotate about a pivot assembly in a direction that substantially parallels the surface of the magnetic storage medium such that a head gimbal assembly coupled to the end of the actuator arm is moved across radially spaced data arrays located on the surface of the magnetic storage medium. However, the actuator arm could be further configured to tilt about a hinge coupled between the actuator arm and the pivot assembly. In this manner, the actuator arm could tilt in a direction opposite the magnetic storage medium when the read/write head has been disabled, thus increasing a fly-height associated with the disabled read/write head with respect to a fly-height associated with other read/write heads in the hard disk drive (HDD) 920.

In a second example, the fly-height associated with the disabled read/write head is increased 920 by chemically, mechanically, or thermally deforming a suspension component coupled to the disabled read/write head. This suspension component may be any component in a head stack assembly (HSA) that couples the disabled read/write head to an actuator. For example, in one embodiment, the suspension component is an electrical lead suspension (ELS) that is coupled to an actuator arm and the disabled read/write head. In an alternative embodiment, the suspension component is a fixture coupled to the disabled read/write head and an actuator arm in the head stack assembly (HSA). In another embodiment, the suspension component is an actuator arm that is configured to suspend the disabled read/write head in a position relative to a magnetic storage medium of a hard disk drive (HDD).

In an alternative embodiment of the present invention, increasing a fly-height associated with a disabled read/write head 920 comprises burnishing the disabled read/write head. For example, a process of "propad" type burnishing may be implemented in which a portion of a slider, which houses a disabled read/write head, is mechanically worn down. By wearing down the side of the slider that faces the magnetic storage medium while keeping the relative positioning of the other components of the hard disk drive (HDD) static, the fly-height between the read/write head and the magnetic storage medium is consequently increased.

With reference still to FIG. 9, in another embodiment of the present technology, the fly-height associated with the disabled read/write head is increased 920 by implementing a thermal fly-height control (TFC) module. The thermal fly-height control (TFC) module is configured to increase the fly-height in response to a read/write disable signal. For example, once it is determined that a read/write head in a hard disk drive (HDD) should be disabled 910, the process of FIG. 9 may be expanded such that a read/write disable signal is generated and sent to the thermal fly-height control (TFC) module. This read/write disable signal communicates to the thermal fly-height control (TFC) module that the read/write head has been disabled, and that the fly-height associated with the disabled read/write head must be increased 920. The thermal fly-height control (TFC) module then generates a change in temperature that causes a thermal-sensitive substrate to change shape. This change in shape of the thermal-sensitive substrate consequently causes the disabled read/write head to be moved in a direction opposite the nearest surface of the magnetic storage medium with which the disabled read/write head had previously been communicating prior to being rendered inoperable. The movement of the disabled read/write head in a direction opposite the magnetic storage medium causes a fly-height associated with the disabled read/write head to be increased 920.

In one specific embodiment, the thermal fly-height control (TFC) module is configured to generate and deliver a change in temperature to a thermal-sensitive substrate configured to constrict or condense in response to a temperature change. The thermal-sensitive substrate is positioned within the head stack assembly (HSA) such that the constriction or condensing of the substrate causes an upward force to be delivered to a slider that houses the disabled read/write head. This upward force causes the fly-height associated with the disabled read/write head to increase 920.

In another embodiment, the thermal fly-height control (TFC) module comprises a thermal-sensitive substrate configured to change shape in response to a temperature change.

For instance, the thermal fly-height control (TFC) module may be configured to constrict or condense in response to a change in temperature that is generated when it is determined that a read/write head in a hard disk drive (HDD) is disabled 910. The thermal fly-height control (TFC) module may be further configured to couple to a slider that houses the disabled read/write head such that the constriction or condensing of the thermal fly-height control (TFC) module causes the slider to be raised relative to a magnetic storage medium in the hard disk drive (HDD). In one embodiment, the thermal fly-height control (TFC) module is positioned within the slider such that the constriction or condensing of the thermal fly-height control (TFC) module causes the shape of the slider to be deformed, which in turn raises the disabled read/write head relative to the magnetic storage medium, causing an increase in a fly-height associated with the disabled read/write head 920.

It should be appreciated by those skilled in the art that various embodiments of the present technology offer potentially significant gains in the reliability of a depopulated drive over prior methods. For example, past implementations of depopulation did not take into account a fly-height associated with a disabled read/write head. Such depopulation processes comprised simply disabling a read/write head and reconfiguring the drive. Indeed, the fly-height was independent of a head's operability, and this independent relationship did not increase overall drive reliability. Thus, the realized reliability was simply the status quo. However, various embodiments of the present invention teach that a person skilled in the art does not need to settle for the status quo regarding depopulated hard drive reliability.

Although various embodiments of the present invention are described in the context of a magnetic read/write head coupled to a slider, it should be understood that embodiments may apply to any devices in which a head is separated from a magnetic storage medium by a characteristic fly-height. For example, embodiments of the present invention may apply to a read/write head that is embedded within, or simply coupled to, a suspension that is affixed to an actuator. In other words, embodiments of the present invention are meant to encompass any devices in which it is possible to raise a read/write head relative to a magnetic storage medium.

The foregoing descriptions of specific embodiments of the present invention have been presented for purposes of illustration and description. They are not intended to be exhaustive or to limit the invention to the precise forms disclosed, and many modifications and variations are possible in light of the above teachings. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A hard disk drive (HDD) device comprising:
   a housing;
   a magnetic storage medium coupled to said housing, said magnetic storage medium configured to rotate relative to said housing;
   an actuator arm coupled to said housing, said actuator arm configured to move relative to said magnetic storage medium;
   a magnetic read/write head coupled to said actuator arm, said magnetic read/write head configured to magnetically write data to and magnetically read data from said magnetic storage medium; and a thermal-sensitive fly-height gain substrate configured to couple with said actuator arm, said thermal-sensitive fly-height gain substrate configured to increase a fly-height associated with said magnetic read/write head when said magnetic read/write head is permanently disabled wherein said thermal-sensitive fly-height gain substrate is configured to increase said fly-height by raising said actuator arm such that said magnetic read/write head is raised relative to said magnetic storage medium.

2. The hard disk drive (HDD) device recited in claim 1 further comprising an electrical lead suspension (ELS) coupled to said actuator arm and said magnetic read/write head, said electrical lead suspension (ELS) configured to suspend said magnetic read/write head in a position above said magnetic storage medium.

3. The hard disk drive (HDD) device recited in claim 2, wherein said thermal-sensitive fly-height gain substrate is configured to increase said fly-height by raising said electrical lead suspension such that said magnetic read/write head is raised relative to said magnetic storage medium.

4. The hard disk drive (HDD) device recited in claim 2, wherein said thermal-sensitive fly-height gain substrate is configured to increase said fly-height by deforming a portion of said electrical lead suspension such that said magnetic read/write head is raised relative to said magnetic storage medium.

5. The hard disk drive (HDD) device recited in claim 1 further comprising a temperature control module coupled to said thermal-sensitive fly-height gain substrate, said temperature control module configured to implement a change in temperature in said thermal-sensitive fly-height gain substrate when said magnetic read/write head is disabled.

6. The hard disk drive (HDD) device recited in claim 1 further comprising a fly-height control module coupled to said housing, said fly-height control module configured to generate a read/write disable signal, and configured to transmit said read/write disable signal to said temperature control module.

* * * * *